US007971093B1

(12) United States Patent
Goel et al.

(10) Patent No.: US 7,971,093 B1
(45) Date of Patent: Jun. 28, 2011

(54) APPARATUS AND METHOD TO PROACTIVELY ADDRESS HARD DISK DRIVE INEFFICIENCY AND FAILURE

(75) Inventors: Atul Goel, Sunnyvale, CA (US); Con Phan, Sunnyvale, CA (US); Cheng Tan, Fremont, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 619 days.

(21) Appl. No.: 12/015,280

(22) Filed: Jan. 16, 2008

(51) Int. Cl.
*G06F 11/00* (2006.01)
(52) U.S. Cl. .............................................. 714/8; 714/7
(58) Field of Classification Search .................. 714/8, 5, 714/7; 369/47.14; 702/186; 711/112
See application file for complete search history.

(56) References Cited

U.S. PATENT DOCUMENTS

| | | | | |
|---|---|---|---|---|
| 5,828,583 A * | 10/1998 | Bush et al. ..................... 702/185 |
| 5,895,438 A * | 4/1999 | Yomtoubian ................... 702/35 |
| 6,384,999 B1 | 5/2002 | Schibilla ........................ 360/53 |
| 6,636,905 B1 * | 10/2003 | McNamer et al. ............. 710/15 |
| 7,051,154 B1 * | 5/2006 | Chng et al. .................... 711/113 |
| 7,246,268 B2 * | 7/2007 | Craig et al. .................... 714/42 |
| 7,275,179 B1 * | 9/2007 | Coatney ............... 714/7 |
| 7,389,396 B1 * | 6/2008 | Goel et al. ..................... 711/167 |
| 7,607,039 B2 * | 10/2009 | Shikama et al. ................... 714/8 |
| 7,656,763 B1 * | 2/2010 | Jin et al. ..................... 369/53.15 |
| 7,661,020 B1 * | 2/2010 | Coatney ............................. 714/7 |
| 2001/0021983 A1 * | 9/2001 | Ono et al. .......................... 714/8 |
| 2004/0100715 A1 * | 5/2004 | Smith et al. ...................... 360/69 |
| 2004/0179288 A1 * | 9/2004 | Kagami et al. ................... 360/53 |
| 2006/0041784 A1 * | 2/2006 | Cumpson .......................... 714/7 |
| 2006/0056088 A1 * | 3/2006 | Kudoh et al. ..................... 360/31 |
| 2007/0022244 A1 * | 1/2007 | Kimmery ...................... 711/106 |
| 2007/0094551 A1 * | 4/2007 | Lambert et al. ............... 714/710 |
| 2007/0239398 A1 * | 10/2007 | Song et al. ..................... 702/186 |
| 2008/0162082 A1 * | 7/2008 | Frazier .......................... 702/186 |

OTHER PUBLICATIONS

Bairavasundaram et al., "An analysis of Latent Sector Errors in Disk Drives", SIGMETRICS'07, Jun. 12-16, 2007.*

* cited by examiner

*Primary Examiner* — Joshua A Lohn
(74) *Attorney, Agent, or Firm* — Leon S. Erikson; John R. Ley

(57) ABSTRACT

The input/output (I/O) performance of a hard disk drive in a mass storage computer system is evaluated to maintain efficiency by addressing I/O commands to sectors of the disk drive, evaluating the execution of the I/O commands to the sectors to obtain performance information for the sectors to which the I/O commands are addressed, comparing the performance information to a predetermined I/O performance criterion, and identifying any impaired sectors in which the performance information indicates less than the predetermined I/O performance criterion. Thereafter, further I/O commands to the impaired sectors are avoided.

25 Claims, 9 Drawing Sheets

APPARATUS AND METHOD TO PROACTIVELY ADDRESS HARD DISK DRIVE INEFFICIENCY AND FAILURE

This invention relates to evaluating the input/output (I/O) efficiency of hard disk drives within a mass or network file storage computer system, and more specifically to a new and improved apparatus and method which uses I/O completion times of hard disk drives of the computer system and information describing media errors on the disk drives to avoid and eliminate proactively the adverse effects of decreasing I/O command processing performance and bad media patches that are associated with an impaired hard disk drive within the computer system.

BACKGROUND OF THE INVENTION

Although hard disk drives are usually reliable for use in mass storage computer systems such as in networked file storage computer systems, disk drives are mechanical devices that are susceptible to degradation and failure. When a disk drive fails, the consequences are usually severe and devastating to the data stored on the disk drive. The failure of a disk drive can result in lost data or files that were produced through a significant investment of time and effort. For commercial or enterprise operations which rely upon disk drives to retain irreplaceable customer records, the failure of a disk drive can be catastrophic.

To guard against the failure of individual disk drives, certain mass storage techniques have been developed which make, or make it possible to create, a redundant copy of the original data. In the event the original data is no longer accessible due to an disk drive failure, the data is restored by accessing the redundant copy of data or by creating the redundant copy. Within the realm of the commercial or enterprise operations in which an enormous amount of information is stored on disk, the preferred approach for storing the data on hard disk drives is one of the many different configurations of a redundant array of independent or inexpensive disks (RAID). The redundancy provided by a RAID grouping of and control over the disk drives beneficially allows a system to maintain continuous operation in the event of a disk drive failure.

During the normal operation of the mass storage computer system, data is transferred to and from the hard disk drives over a communication link. A mass storage adapter manages the transfer of data between the hard disk drives and a server computer. Various interface protocols exist to manage the reading and writing of data between the mass storage adapter and the server computer, and such interface protocols include advanced technology attachment (ATA), serial advanced technology attachment (SATA), small computer systems interface (SCSI), fibre channel (FC), and a serial access storage (SAS). Although these various interface protocols are effective, their responses to the server are limited to the detection and response of a failure of the disk drive, and not to the real-time or advance recognition of deteriorating performance in an impaired disk drive which remains partially functional although at a diminished capacity. The interface protocols provide inadequate, if any, real-time warning about a possibility of impending failure of the disk drives.

Although the ability to recover data after a disk drive failure is of tremendous benefit, waiting until the disk drive or some portion of the disk disk drive to fail has disadvantages. Impairment of a disk drive can occur because of the sudden introduction of a particulate contaminant which destroys or impairs the magnetic recording media upon which the data is written, thereby destroying or damaging the data at the location of the contamination. The magnetic recording media of the disk drive is also subject to the gradual magnetic degradation over time, in which case the data written to the magnetic media becomes more difficult to read and write due to the diminished magnetic strength. Flawed mechanical or electrical operation of the disk drive can also cause the data to be written on the magnetic recording media without adequate strength for future I/O use.

In the case of an instantaneous disk drive failure, the failure is recognized quickly by the interface protocol and the server is notified so that no further I/O commands are addressed to that disk drive and so that remedial action can be taken to attempt to recover the data contained on the failed disk drive. In contrast, when the disk drive becomes impaired through the gradual degradation of its components, the efficiency of executing I/O commands decreases slowly and the computer continues to address I/O commands to the inefficiently operating disk. Until the adversely affected disk or disk portion degrades to the point of failure, the overall performance of the mass storage computer system continues to degrade with the disk drive. The decreasing efficiency resulting from the continued degradation of the disk drive remains undetected because the interface protocol usually recognizes only disk drive failures.

The inefficient execution of I/O commands can adversely affect the performance and operation of the computer system in a number of ways. Inefficient I/O command execution slows the data throughput and overall efficiency of the mass storage computer system. If the inefficient execution of the I/O commands becomes substantial, an application timeout called by, for example a program or an operating system, may occur. An application timeout is the maximum amount of time established for execution of the particular application. The application timeout is set to indirectly recognize hardware or equipment failures or problems with software execution such as program hangs. Upon an application timeout, it is necessary to restart or reboot the entire computer system, which can become a very time consumptive and intricate task during which no mass storage data operations occur.

SUMMARY OF THE INVENTION

The present invention monitors and evaluates on a continuous basis the occurrence of media errors and input/output (I/O) efficiency of hard disk drives within a mass or network file storage computer system, independent of and without reliance upon any communication bus or interface protocol. The evaluation from the present invention supplies accurate and useful information concerning the performance and impending failure of hard disk drives of a storage computer system, before the time that the hard disk drive actually experiences failure, or becomes substantially impaired, or before execution of applications which might invoke inefficiency-promoting application timeouts due to excessive times required to perform I/O commands. The occurrence of media errors and the I/O efficiency are used to remedy bad media patches before the bad media patches degenerate further to cause increasingly poor disk drive performance or failure.

In accordance with these and other features, a main aspect of the invention involves a method to evaluate input/output (I/O) performance of a hard disk drive in a mass storage computer system. The hard disk drive has multiple tracks and multiple sectors in each track. The method involves addressing I/O commands to the sectors, evaluating the execution of the I/O commands to the sectors to obtain performance information for the sectors to which the I/O commands are addressed, associating the performance information with the sectors to which the I/O commands are addressed, comparing the performance information to a predetermined I/O performance criterion, and identifying any impaired sectors in which the performance information indicates less than the predetermined I/O performance criterion.

More detailed aspects of the invention involve dispatching supplemental I/O commands to sectors adjacent to the impaired sectors, evaluating the execution of the supplemental I/O commands to the adjacent sectors to obtain performance information for the adjacent sectors, associating the performance information with the adjacent sectors to which the supplemental I/O commands are addressed, comparing the performance information for the adjacent sectors to a predetermined I/O performance criterion, and identifying further impaired adjacent sectors for which the performance information indicates less than the predetermined I/O performance criterion. The predetermined I/O performance criterion may be established by measuring a time required to complete each I/O command, the measured time constituting an I/O completion time, and establishing the predetermined I/O performance criterion from the I/O completion time.

Further detailed aspects of the invention involve maintaining efficiency and executing I/O commands by identifying a bad patch of sectors formed by the impaired and further impaired sectors and addressing I/O commands to sectors other than the bad patch of sectors; or by avoiding addressing I/O commands to any impaired sectors; or by retiring the hard disk drive from further use when the impaired sectors and further impaired sectors occupy a substantial predetermined portion of the hard disk drive; or by storing the I/O completion times for the impaired sectors in a data table, determining a range of sectors addressed by each I/O command, accessing the data table of the stored I/O completion times to obtain the I/O completion times for the range of sectors addressed by the I/O command, predicting a completion time of the I/O command using the I/O completion times obtained from the data table, dispatching the I/O command to the hard disk drive when the predicted completion time is not greater than a predetermined application timeout, and if the predicted completion time is greater than the predetermined application timeout, servicing the I/O command through an alternate process, such as by reconstruction of the hard disk through a redundant array of independent disks or by the use of a dirty region log.

A more complete appreciation of the present invention and its scope, and the manner in which it achieves the above and other improvements, can be obtained by reference to the following detailed description of presently preferred embodiments taken in connection with the accompanying drawings, which are briefly summarized below, and the appended claims.

DETAILED DESCRIPTION

Degradation in performance of a disk drive may result from a variety of causes and effects. As the degradation in the performance of a disk drive occurs, the present invention recognizes deficiencies occurring with respect to a hard disk drive as a whole, and even more specifically with respect to specific tracks and sectors of a hard disk drive. Remedial measures are taken to assure that the degradation in performance of a hard disk drive does not inhibit the short term I/O data transfer efficiency or the long term functionality of a network file storage computer system possessing a hard disk drive with degrading performance. The present invention involves an improvement in determining, monitoring and analyzing the amount of time required to complete I/O commands on a hard disk drive, and determining, monitoring and analyzing the capability of individual data sectors and groups of continuous and adjoining data sectors known as "patches" on a hard disk drive to reliably read and write data. The present invention is preferably implemented by instructional code or firmware which is a part of a mass storage operating system and which is executed by the components of the network file storage computer system.

Figure 1:
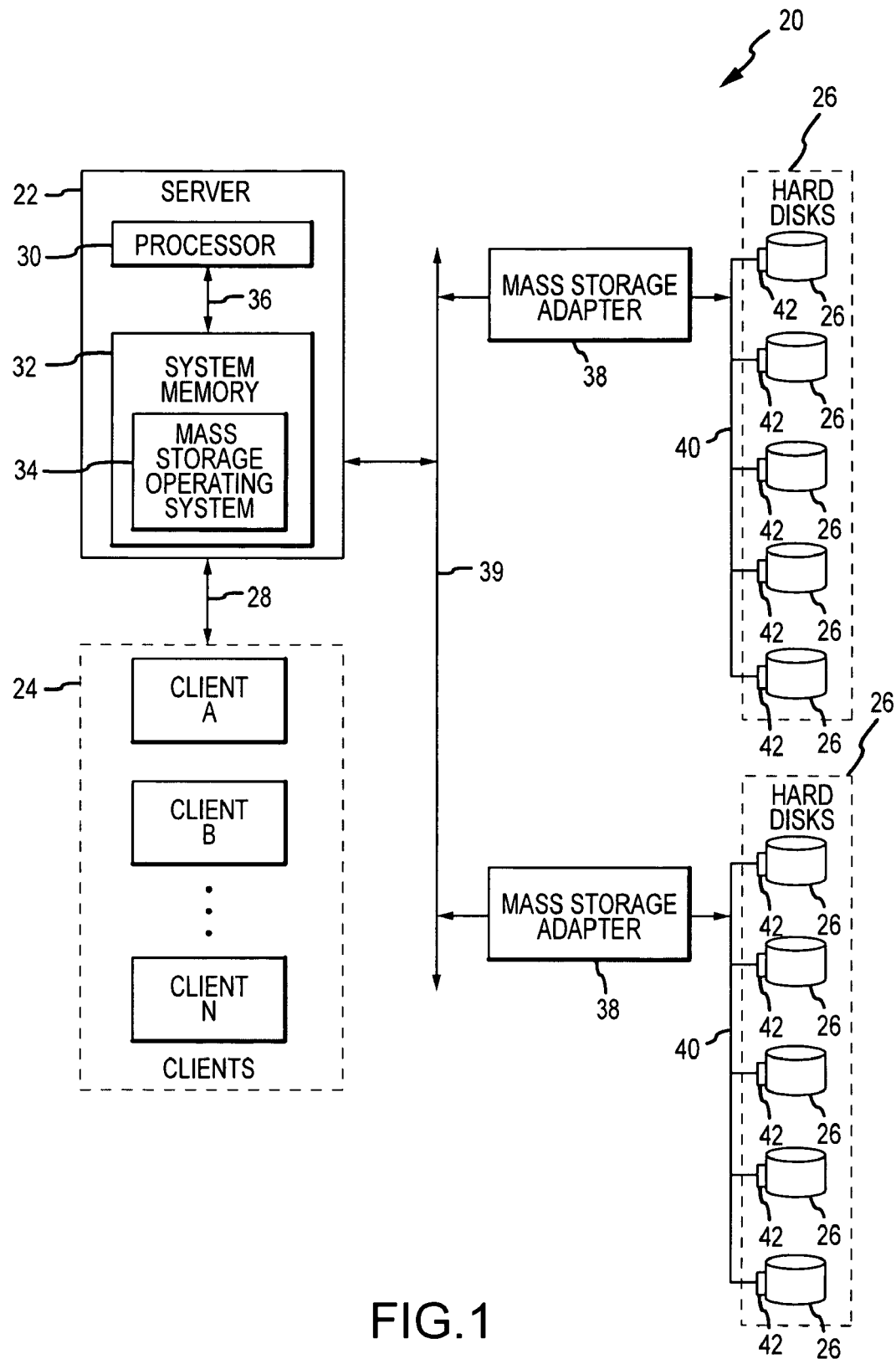
FIG. 1 is a block diagram of a network file storage computer system in which the present invention is incorporated.

The invention is preferably implemented in a network file storage computer system 20 as basically shown in FIG. 1. The computer system 20 includes a server computer 22 ("server") and a plurality of client computers 24 (each a "client"). The server 22 communicates data between mass data storage hard disk drives 26 and the clients 24, in input/output (I/O) operations. Typically the I/O operations are originated by the clients 24. A client 24 is any type of computer which reads and writes data. The data communicated in the I/O operations is transferred between the hard disk drives 26, the server 22 and the clients 24 by a computer network communication link 28. Conventional computer network protocols are used to transfer data between the server 22 and the clients 24 over the link 28. Those conventional protocols include Fibre Channel Protocol (FCP), Ethernet, and Internet Small Computer System Interface Protocol (iSCSI). In general, the server 22 and the clients 24, function in a traditional server-client mass data storage communication relationship with the hard disk drives 26.

The server 22 includes a conventional central processing unit (CPU) or processor 30 and a conventional system memory 32. The system memory 32 contains instructional code or firmware to supply the functionality of the server 22. Some of the code stored in the system memory 32 forms a mass storage operating system (MSOS) 34 which causes the processor 30 to perform the I/O operations and commands between the server 22, the clients 24 and the hard disk drives 26, and to respond to I/O requests from the clients 24, and to perform data management functions on the hard disk drives 26, among other things. In addition to storing the code for the MSOS 34, the system memory 32 also stores the instructional code or firmware which the processor 30 uses to execute the conventional bus communication protocol by which to communicate data and commands between the server 22, the clients 24 and the hard disk drives 26. The code for the bus communication protocol may be separate from or included within the MSOS 34. An example of a MSOS is Data ONTAP®, which is available from Network Appliance, Inc. of Sunnyvale, Calif., the assignee of the present invention. The main memory 32 is available for use to hold other programs, instructions and the results of data processing calculations performed by the processor 30. The processor 30 accesses the program code stored within the system memory 32 through a server system bus 36.

A conventional mass storage adapter 38 is connected to a data bus 39, and the mass storage adapter 38 receives the I/O and other mass data storage commands from the server 22. In response, the mass storage adapter 38 causes the disk drives 26 to act and respond accordingly, either by executing a read command in which data previously written or stored on the hard disk drives 26 is read and supplied to the server 22 or the clients 24, or by executing a write command in which data is written or stored on the hard disk drives 26, or other typical mass storage I/O operations.

The group of relatively inexpensive nonvolatile mass storage disk drives 26 are connected by a separate bus 40 to the mass storage adapter 38. Each disk drive 26 includes a controller 42 which causes the disk drive 26 to perform in accordance with normal hard disk drive functionality and to perform I/O commands delivered to it by the mass storage adapter 38.

The mass storage adapter 38, the group of disk drives 26, their controllers 42, and the interconnection bus 40 form a conventional redundant array of inexpensive or independent disks (RAID) mass storage system. The mass storage adapter 38 contains the necessary independent functionality to perform typical RAID mass storage functions in conjunction with the other components of the typical server. Substantial and well-known benefits of redundancy for data stored on the hard disk drives 26 against corruption and loss is achieved by organizing and controlling the disk drives 26 as a RAID group. The mass storage adapter 38 contains its own processor (not specifically shown) to respond to the I/O commands generated by the MSOS 34 and to initiate its own other data management functions to be executed by the hard disk drives 26.

The present invention involves an improvement in determining, monitoring and analyzing the amount of time required to complete I/O commands on each of the hard disk drives 26, and determining, monitoring and analyzing the capability of individual data sectors and groups of continuous and adjoining data sectors known as "patches" on each hard disk drive 26 to reliably read and write data. A data sector is the smallest unit of data that can be accessed by a hard disk drive 26. I/O command completion times are collected and compared to a predetermined acceptable performance threshold which has been previously established. The comparison between the actual amount of time required to complete I/O commands and the predetermined acceptable performance levels are thereafter used to identify and characterize the capability and performance of the data sectors and the hard disk drive 26 as a whole with respect to its ability to read and write data. The characterization avoids in real-time use many of the typical I/O irregularities that befall hard disk drives 26 in a network file storage computer system, and instead avoid the problems caused by such I/O irregularities and thereby sustain a more consistent and higher data throughput and I/O performance. In addition, the present invention offers the capability of predicting future I/O command completion times, which allows alternative I/O actions and commands to be executed under circumstances where an application timeout and the necessity to restart the entire network file storage computer system could otherwise occur. Further still, the present invention offers the capability of assessing the integrity of the data previously written to the disk media of the hard disk drives. Many other desirable benefits also result from the present invention.

The present invention recognizes the degradation in performance of a hard disk drive 26 in real-time before the degraded performance creates serious problems for the entire network file storage computer system. The functional aspects of a conventional hard disk drive 26 which could lead to degraded performance are better understood by reference to the basic characteristics of a hard disk drive 26, shown in FIG. 2.

A conventional hard disk drive 26 includes a platter 50 which has smooth upper and lower circular surfaces upon which a magnetic coating or recording medium 54 is attached. Each disk drive 26 includes at least one, and typically more, of the platters 50. Characters are magnetically induced or recorded in concentric circular tracks 52 in the magnetic recording surface 54. The concentric tracks 52 extend from an inner diameter position of the magnetic recording surface 54 to an outer diameter track, and the tracks 52 are very close together. Typically, there at least thousands or tens of thousands of the tracks 52 on each platter 50. Each track is identified by a track number which is established by a code of magnetic characters recorded in each track 52.

Figure 2:
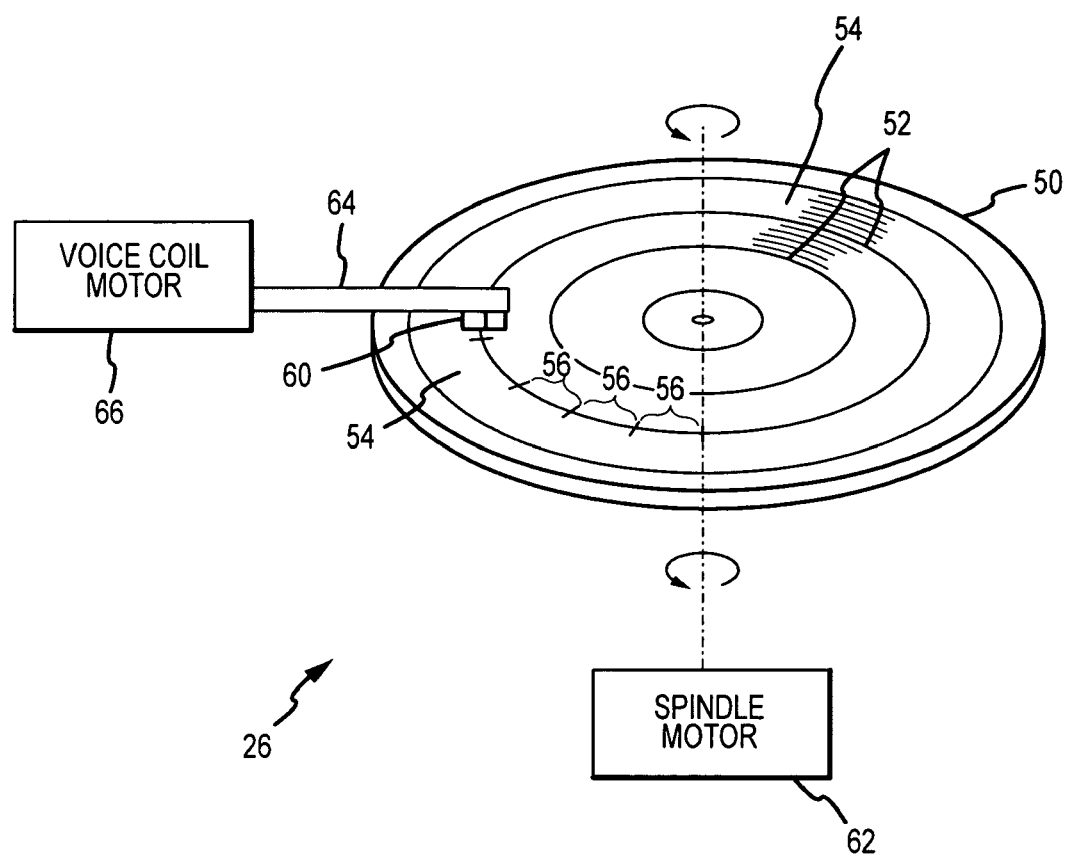
FIG. 2 is a generalized illustration of part of a conventional hard disk drive used in the computer system shown in FIG. 1.

Each track 52 is divided into a number of sectors 56. Each sector 56 is the smallest unit of data that can be accessed by the disk drive. Typically each sector 56 contains at least 512 bytes of data. The sectors 56 of each track 52 are further identified by a code of magnetic characters recorded in each sector. In addition to the number identification of the sector 56 in each track, the magnetic characters associated with each character define the beginning and ending points of that sector. Thus, by use of the track number and the sector number, each unit of data recorded on the magnetic recording surface 54 can be located and accessed for reading or writing. Although only a few tracks 52 and sectors 56 are shown in FIG. 2, typically at least tens or hundreds of thousands of sectors are present on each platter 50.

A head 60 floats on a cushion of air above each magnetic recording surface 54 and senses electrical signal transitions induced by the movement of the magnetic characters beneath the head 60, when the platter 50 rotates as a result of a spindle motor 62 rotating the platter 50. In this manner, data is read from the sectors 56 and is supplied as electrical signals. The head 60 also has the capability of inducing the magnetic characters in each track in response to electrical signals supplied to the head 60. In this manner, data is written to the sectors 56. The head 60 is connected to an arm 64, and the arm 64 is moved by a voice coil motor 66 to precisely align the head 60 above the tracks 52. Precise alignment is established in part by the head 60 reading the track numbers. The data at a particular sector 56 is identified by reading the sector number as the sectors of the track pass beneath the head 60 the platter 50 rotates. Although not shown in FIG. 2, one head 60 and one arm 64 are associated with each magnetic recording surface, meaning that each platter 50 includes one head 60 for reading the top side of the platter 50 and one head 60 for reading the bottom side of the platter 50. The structure, arrangement and function of the disk drive 26 shown in FIG. 2 is conventional.

Degradation in performance of the disk drive 26 may result from a variety of causes and effects, such as those that occur through media, head, and particle events. The natural magnetic strength of the characters recorded in the magnetic recording surface 54 may degrade or erode with time, principally as a result of natural loss of magnetism of the recording surface 54. The area or patch of the recording surface 54 with diminished magnetic strength may grow with time, because of the magnetic recording surface 54 may exhibit defect growth symptoms. The characters may not be initially written with sufficient magnetic strength to provide reliable signal transitions when read by the head 56. Generally speaking, inadequate magnetic character strength results from the head 60 momentarily flying or floating too high above the magnetic recording surface 54, usually as a result of a shock force applied to the entire hard disk drive. When the head 60 is too high above the magnetic recording surface 54, the magnetic effects of the head 60 are not strong enough to impart adequate magnetic strength for the characters, since the magnetic strength imparted is directly related to the distance between the head 60 and the magnetic recording surface 54. A small particle of dust or other contaminant may contact the magnetic recording surface 54 or lodge between the head 60 and the magnetic recording surface 54. Such a particle contaminant may damage sectors 56 of the tracks which it contacts, or may physically impair the track or create sufficient heat through friction to the point where the magnetic material which defines the characters is physically altered. A scratch on the sectors 56 will destroy the magnetic characters in those sectors. The small contaminant particle may also elevate the head 60 above the magnetic recording surface 54.

Usually the interface to each hard disk drive 26 and/or the mass storage adapter 38 associated with the disk drive 26 (FIG. 1) includes both retry functionality and error correcting code functionality which attempt to recover errors when data is read incorrectly or incompletely from the tracks 52 and sectors 56. To do so, however, usually requires a considerable extended period of time compared to executing an I/O read command which is not influenced by errors. For example, it may be necessary to read the particular tracks and sectors associated with an I/O read command a multiple number of times in order for the error correcting code functionality to correctly derive the data. Of course, using error correction code functionality to obtain the desired data is undesirable, because the added time consumed to do so diminishes the overall data throughput and efficiency in executing the I/O commands.

The present invention recognizes deficiencies occurring with respect to each of the hard disk drives 26 as a whole, and even more specifically with respect to specific tracks 52 and sectors 56 on each of the platters 50 of each hard disk drive 26 (FIG. 2), and takes remedial measures to assure that the deterioration in performance of the hard disk drive does not inhibit the short term I/O data transfer efficiency or the long term functionality of the network file storage computer system 20. If sectors 56 are adversely affected, such as from magnetic degradation or particle contamination, these adversely affected areas, known as "patches," are identified and not thereafter used to record data. If I/O data transfers become prolonged, and if the sectors to which the data I/O data transfers are directed are shown to be an acceptable condition, the mechanical and electrical functionality of the hard disk drive such as that of the spindle motor 62 or the voice coil motor 64 may indicate degradation in performance of the entire disk drive. Upon recognizing a significant deterioration in performance, either from certain adversely affected sectors or patches or from general degradation in mechanical and electrical functionality, previously written data from the affected sectors and patches or from all of the sectors of the disk drive 26 is copied to another properly functioning disk drive, and that properly functioning disk drive is thereafter used as a replacement for the degraded disk drive. Alternatively, if it is not possible to copy the data from the adversely affected sectors or patches or from the disk drive as a whole, it may be possible to reconstruct all of the data as a result of the RAID configuration of which the degraded disk drive is a part.

Figure 3:
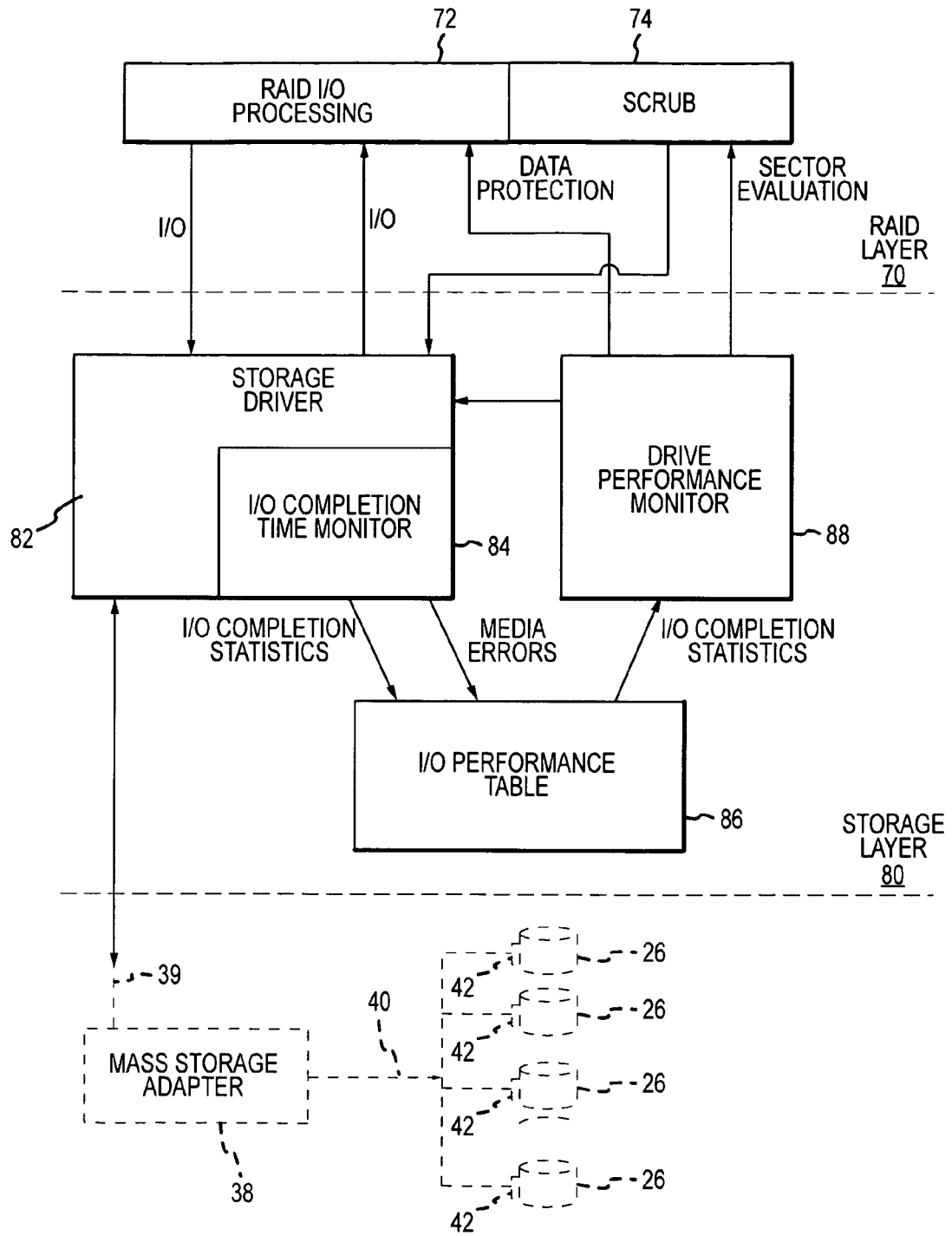
FIG. 3 is a block diagram of utilities of the present invention incorporated within a mass storage operating system of the computer system shown in FIG. 1.

The present invention is preferably implemented by instructional code or firmware which is a part of the MSOS 34 and which is executed by the components of the network file storage computer system 20 (FIG. 1). The MSOS 34 includes many different code modules or layers to execute the many different functions or utilities necessary to implement a network file storage computer system 20, but only one of the preexisting layers in the MSOS 34, a RAID utility layer 70, is shown in FIG. 3.

The RAID layer 70 manages reading and writing the data on the hard disk drives 26 in accordance with the conventional RAID protocols and conventional RAID functionality. The RAID layer 70 invokes conventional RAID I/O processing utility 72 for executing the RAID protocols, including delivering I/O commands to the mass storage adapters 38 which control the hard disk drives 26, and providing redundancy through the ability to reconstruct lost or corrupted data in a wide variety of different circumstances. Part of the conventional RAID protocol includes a conventional hard disk drive data sector scrubbing utility 74. The scrub utility 74 scrubs the sectors of the hard disk drives to identify and confirm sectors and patches which present undesirable performance characteristics. During a data scrub operation, data is read from the sectors of the hard disk drives 26 to determine which sectors and patches have excessive I/O completion times or media errors.

Other than its interaction with the data scrub utility 74, the present invention is primarily incorporated within a new or enhanced storage layer 80 of the MSOS 34. The instructional code of the storage layer 80 invokes a storage driver utility 82 which receives the I/O commands generated from the RAID I/O processing utility 72 and which transmits those I/O commands to the mass storage adapters 38 (FIG. 1). The storage driver utility 82 supervises the I/O commands and transfers them to and from the hard disk drives 26. The storage driver utility 82 also includes an I/O completion time monitor 84 as a subutility. The I/O completion time monitor utility 84 provides timing to measure the amount of time required to complete an I/O operation or command when reading or writing data to one or more sectors of the disk drive 26.

The I/O completion time or response time characterizes disk drive performance by measuring the actual time required for the disk drive head to read or write data over known sectors. Alternatively, the I/O completion time is used to calculate a sequential bandwidth of data transfer which characterizes disk drive performance by measuring the amount of data which can be read during a predetermined time period. Sequential bandwidth is important in determining the performance of disks that store large files, such as video files, in which large amounts of data are sequentially read from the disk and it is desirable to read this data as rapidly as possible.

The I/O completion time derived by the I/O completion time monitor utility 84, as well as other information to the extent described below, is stored in an I/O performance table

86. Information stored in the table 86 is available to assess and predict the functional performance and condition of each of the sectors 56 of each hard drive 26 within the network file storage computer system 20 (FIG. 1), as well as to assess and predict the overall mechanical and electrical functional performance of each disk drive 26. Each of the disk drives 26 is separately identified in the I/O performance table 86, and each of the sectors 56 of each disk drive are also separately identified. As is explained in greater detail below, enough information is provided to evaluate and predict the performance of each disk drive with respect to each sector.

The data stored in the table 86 allows comparisons between past and present results from which trends in disk performance can be detected and predicted. To conserve the memory consumed by the table 86, data is only stored for those I/O completion times and sectors which indicate diminished performance. The I/O performance table 86 is updated to remove information which is no longer applicable or will not be of use in the future, as which occurs if a disk drive is repaired or replaced or if sectors or media patches having diminished performance have been corrected, for example.

Figure 4:
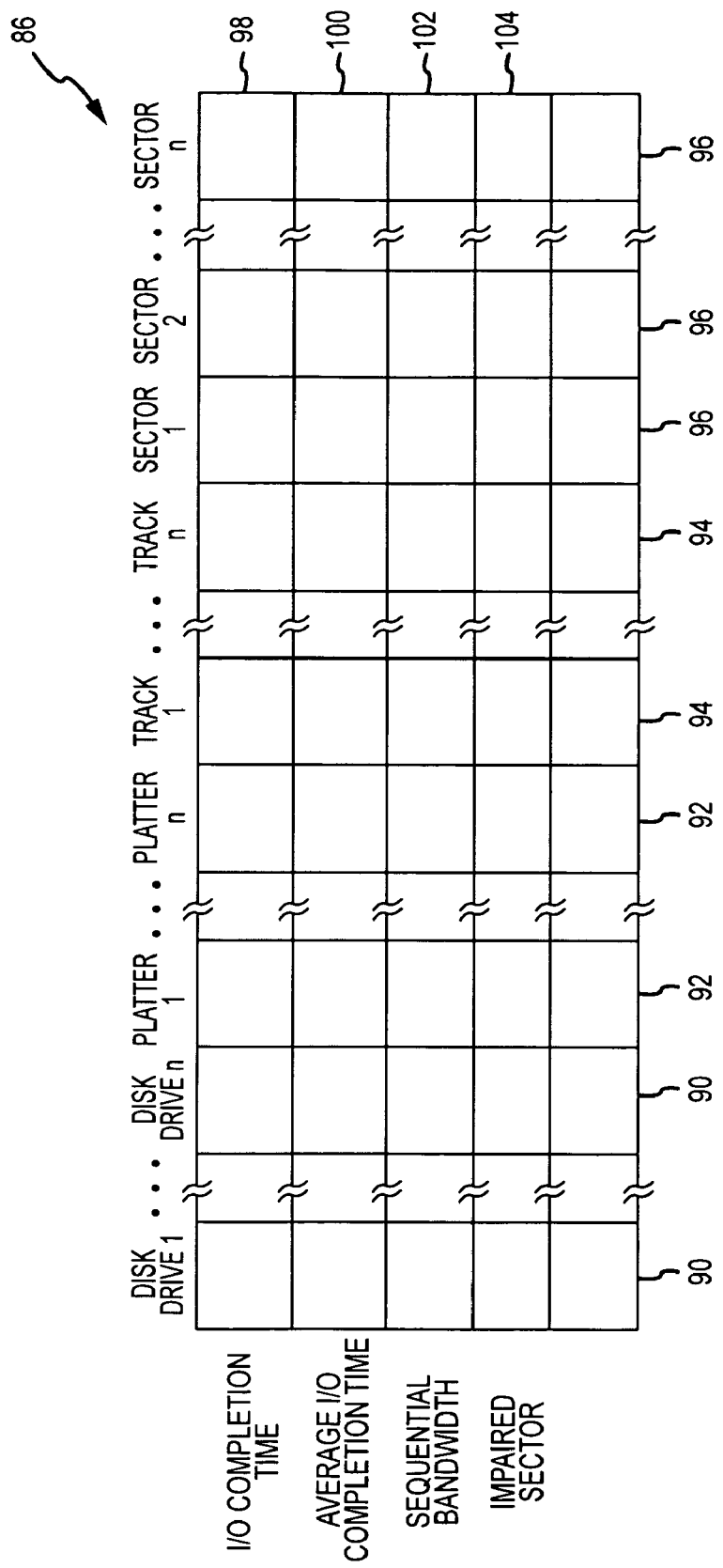
FIG. 4 is an illustration of a table and its contents used in executing the utilities of the present invention shown in FIG. 3.

The table 86 shown in FIG. 4 represents one technique to classify the discrete portions of the hard disks 26, but other classification techniques exist. For instance, the platters 92 of the disks 90 are divided into zones (not shown) which contain a specific number of the tracks 94, such as 1000 of the tracks 94 per each zone. In this classification technique of the disks 90, the sectors 96 are associated with only the zones, and the tracks 94 within the table 86 as shown in FIG. 4 are eliminated. In essence, the zones are a broader implementation of the tracks 94 in this classification technique, as the zones retain the same type of functionality as the tracks 94 for identifying any of the sectors 96. Classifying the disks 90 with the zones can reduce the size of the table 86 which may be advantageous as disk size capacity continues to increase over time.

The instructional code of the storage layer 82 also invokes a disk drive performance monitor utility 88 to evaluate and monitor the operating conditions of each of the hard disks 26. The performance monitor utility 88 responds to the information stored within the table 86. The disk drive performance monitor utility 88 evaluates and monitors various different performance characteristics of each disk drive.

The performance monitor utility 88 assesses the efficiency of each disk drive by calculating an average I/O completion time for the disk drive and/or by determining the sequential bandwidth of the disk drive. If either of these values falls below a predetermined threshold, a compromised or degrading disk drive is indicated. When the overall efficiency of an impaired disk falls below a given threshold, the performance monitor utility 88 may instruct the RAID I/O processing utility 72 to transfer data from the impaired disk drive to a different disk drive, or may transfer data from an impaired sector or patch to an unimpaired sector or patch or to a different disk drive.

The performance monitor utility 88 also includes a capability to calculate or identify improperly functioning sectors and patches of sectors on the recording media of each disk of each disk drive. Based on lengthy or excessive I/O completion times stored in the table 86, the performance monitor utility 88 invokes the scrub utility 74 of the RAID layer 70. The scrub utility 74 performs read commands on the identified media patches containing sectors with lengthy or excessive I/O completion times. The results of the read commands used during scrubbing identify those sectors which are likely to have a degraded or impaired magnetic surface, thereby making the data on individual sectors and patches unreliable for reading or writing. The impaired sectors and ranges of sectors which form a patch are identified and stored within the table 86. The performance monitor utility 88 uses information which describes the impaired sectors and patches in those calculations and estimations which indicate the performance of each of the disk drives as a whole as well as the performance of each disk drive relative to a range of sectors.

The performance monitor utility 88 also estimates the time required for a proposed I/O command to be completed, by considering the I/O completion times and the sectors of the disk drives with which the I/O command will interact with to complete the I/O command. The I/O completion times and the sector information are obtained from the table 86. The estimation typically occurs during execution of an application program which originated the I/O command. Based upon the estimated I/O completion time, the performance monitor utility 88 evaluates whether the execution of the proposed I/O command will result in an application timeout. An application timeout is that maximum amount of time provided to execute an I/O command or a part of an application. If the application timeout is exceeded, it is assumed that a operational difficulty has arisen, such as a application hang or hardware problem, and thereafter the entire computer system is rebooted. Estimating the I/O completion times avoids the execution of I/O commands that could lead to an application timeout, and thereby avoids the considerable inefficiency associated with restarting the entire computer system. If such a situation arises, then the disk is momentarily offlined and the I/O command executed through the other drives in the RAID configuration. After servicing the I/O command by offlining the disk, the disk is returned online and used for serving other I/O commands.

The table 86 is preferably organized as a database which allows each of its contents to be specifically indexed and searched. An example of the table 86 is shown in FIG. 4. The table includes columns to identify each disk drive, each platter of each disk drive, each track of each disk, and each sector of each track, all of which are indicated at 90, 92, 94 and 96, respectively. The rows associated with the table 86 include entries for the I/O completion time with respect to each sector at 98, the average I/O completion time for a range of sectors at 100, the sequential bandwidth for the disk drive at 102, and a capability to indicate the particular sectors of each disk drive that may be impaired, as shown at 104. Of course, there may not be entries at all of the intersections of the rows and columns in the table 86, but organizing the table with the rows and columns allows the information in each row and each column to be searched in a rapid manner.

The process flows in executing the functions of the storage driver utility 82, the I/O completion time monitor utility 84 and the drive performance monitor utility 88, and their interaction with the table 86, is illustrated by the flowcharts shown in FIGS. 5-9. The process flows operate continuously in the background of the mass storage operating system or are readily executable when required.

Figure 5:
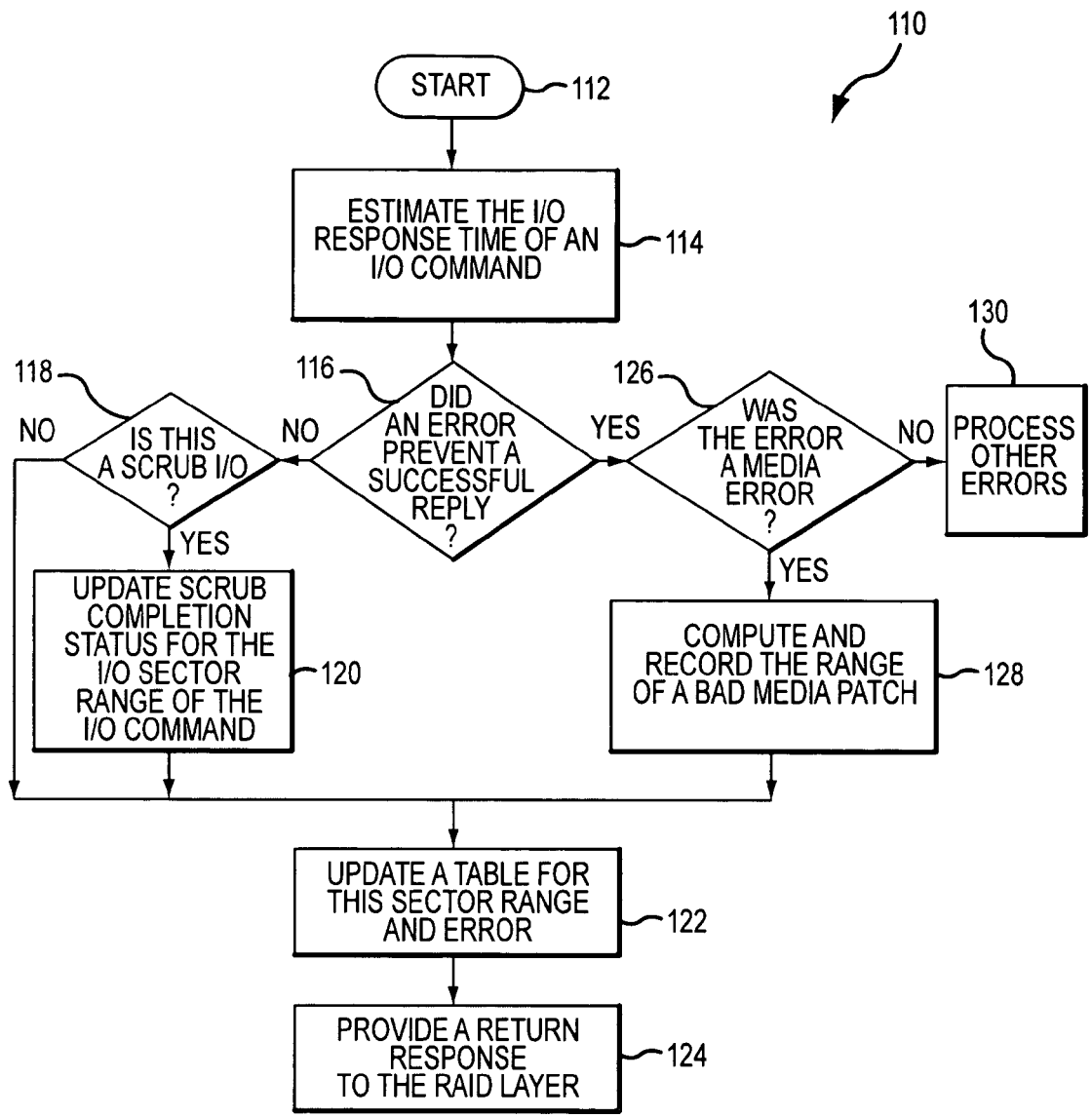
FIG. 5 is a flow diagram for obtaining input/output (I/O) completion time information for I/O commands that are executed by the utilities of the present invention shown in FIG. 3.

An I/O response is processed by the flow 110 shown in FIG. 5. The process flow 110 is initiated at 112 and followed by the measurement at 114 of the amount of time taken to complete the I/O command. During the execution of the I/O command, data is written to and/or read from at least one sector 56 of the hard disk drive 26 (FIG. 2).

Since there are multiple hardware components along the path that the I/O command is communicated (see FIG. 1), the time measurements at 114 are performed only when the intermediate components are known to be in a normal state of operation. If the disk drive can only accept a single command at a given time, and there are no other pending commands on the drive, then the time to process and complete an I/O command (C_t) is estimated as the difference between the time the command was dispatched (cmd_d) from the storage driver utility 82 (FIG. 3) to the hard disk drive and the time that the data transfer associated invoked by the I/O command was completed (txfr_c). For each disk drive, the I/O completion monitor utility 84 (FIG. 3) also records the last known position of the head 60 (FIG. 2) in the sector where the last command was served. This information is used to approximate the time taken to position the head from its last known position. A fairly close estimate for the head positioning time (head_positioning_time) can be derived from knowledge of the average disk drive seek time and the rotational speed (revolutions per minute, RPMs) of the disk of the disk drive. Thus, the time to complete an I/O command is calculated as C_t=txfr_c−cmd_c−head_positioning_time. This calculation is performed by the I/O completion time monitor utility 84 (FIG. 3).

Almost all modern disk drives use native command queuing (NCQ), which allows them to accept multiple I/O command requests which can then be reordered and serviced in the most efficient manner. Under such circumstances, the above formula cannot be used. However, since a disk drive with NCQ can only process a single command at any time, the completion time (c_t) for an I/O command can be calculated as the difference between the time at which the data transfer for the given I/O command completed (txfr_c) and the time at which the last transfer completed (txfr_c_last). Thus, the time to complete an I/O command is calculated as c_t=txfr_c−txfr_c_last−head_positioning_time. This second approach to calculating the I/O completion time is performed by the I/O completion time monitor utility 84 (FIG. 3). The storage driver utility 82 receives the signal indicating a successful completion of the I/O command, and the time when the storage driver utility 82 delivered the I/O command is also available, from which to subtract the two values and arrive at the I/O completion time.

After the measurement of the I/O completion time at 114, whether an error was detected which prevented a successful reply in response to the I/O command is determined at 116. When a successful reply is obtained because an error did not occur, a further determination at 118 is made as to whether the successful reply resulted from a scrub command delivered from the scrub utility 74 (FIG. 3). A negative determination at 118 indicates that the successful reply resulted from typical or normal I/O transfer execution, as opposed to a scrub command. In the event that the I/O completion time is derived at 114 in conjunction with a scrub command, the range of sectors involved in the I/O scrub command and the acceptable or impaired status of the sectors in that range (based on the I/O completion times) is updated in the table 86 (FIGS. 3 and 4) as shown at 120. By executing the process flow 110 multiple times, a plurality of measured I/O response times are obtained and stored in the table 86 as a database of information which identifies those portions, if any, of the hard disk drives 26 (FIG. 1) which execute I/O commands with normal efficiency or with the reduced or impaired efficiency.

During the execution of multiple write commands in some system environments, one of the write commands may experience a high latency as indicated by its failure to meet the predetermined acceptable performance threshold. In this situation, the storage driver utility 82 receives from the relevant disk drive 26 a list of sectors which were previously accessed within a short time period, such as a few seconds, prior to the high latency write command. From the list of sectors, the storage driver utility 82 determines whether a background write command was processed just before the high latency write command. When a background write command precedes the high latency write command, the possibility exists that only one or both of the write commands are associated with bad sectors or patches. Due to the uncertainty of the situation, the sectors and times associated with both the background write command and the high latency write command are updated within the table 86.

After updating the table 86 (FIGS. 3 and 4) at 120, or when the I/O command is issued for typical I/O command execution as determined at 118, the table 86 is then updated with the I/O command completion time as shown at 122. The updated information recorded in the table 86 is the average I/O completion time measured at 114 for the range of sectors involved in the I/O command.

After updating the I/O performance table at 122, a return response to the RAID layer 70 (FIG. 3) is generated at 124. Return responses to RAID layer are messages to indicate the result of the I/O command, such as success, timeout, failed, and media error obtained.

If a successful reply is not obtained at 116 because of the occurrence of an error, a determination is made at 126 of whether a media error was reported in response to the I/O command. A media error may occur from a defect of the magnetic coating 54 (FIG. 2) on the disk drive 26 to adequately write the data of the I/O command or to permit reading of the data previously recorded. The occurrence of a media error suggests that additional media errors may similarly occur for future I/O commands involving the sectors nearby the range of sectors encompassed by the I/O command which caused the report of the media error at 126. An affirmative determination at 126 is used to institute a bad or impaired patch range computation (discussed in greater detail in conjunction with FIG. 6) to identify other sectors adjacent to the sector from which the media error was reported at 126. Frequently, when one or more sectors are impaired because of media errors, adjacent sectors are also impaired. Identifying adjacent impaired sectors avoids the time delays associated with other, future I/O commands directed to those impaired adjacent sectors, thereby facilitating and improving the data throughput by recognizing those impaired adjacent sectors before I/O commands are attempted to or from those adjacent impaired sectors. Subsequent to the computation and recording of the bad media patch range at 128, the table 86 is updated with the I/O response time as well as the presence of media errors at 122 and a return response to RAID layer 70 (FIG. 3) occurs at 124, as previously described.

When an error is detected at 116 and subsequently determined not to be a media error at 126 as evidenced by no report of a media error, a non-media error is present and these other types of errors are processed at 130. Such non-media errors may involve, for instance, a timeout or hard disk failure. In the case of a timeout, the timeout error processed at 130 involves re-sending the I/O command to the hard disk. Alternatively, the failure error processed at 130 involves reconstructing the contents of the failed hard disk onto a new disk drive.

Figure 6:
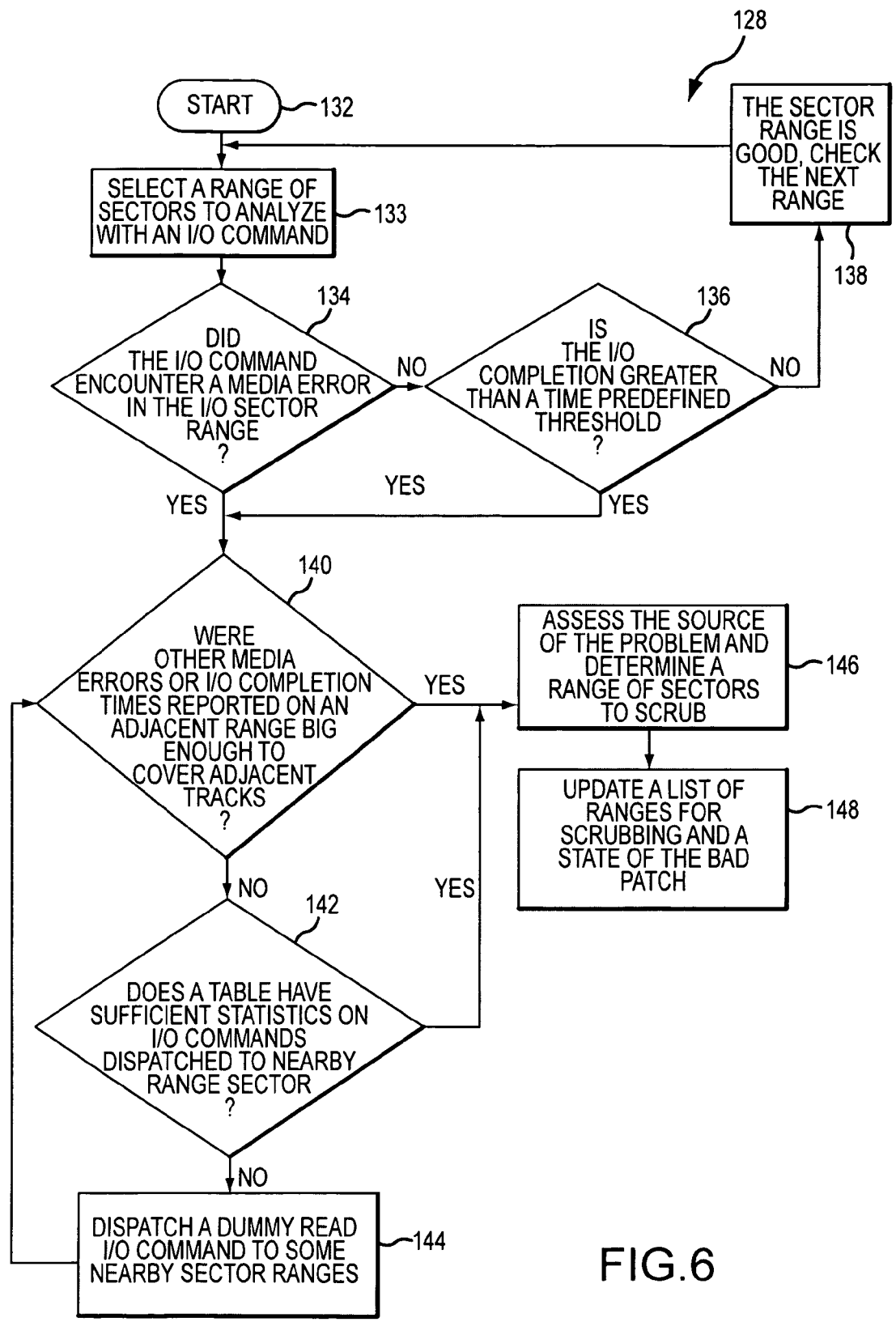
FIG. 6 is a flow diagram for determining a range of sectors of a hard disk drive of the computer system shown in FIG. 1, which may be impaired or bad due to a media error.

The process flow 128 for computing the extent of a bad or impaired patch of sectors is shown in greater detail in FIG. 6. The process flow 128 is typically conducted in the background of the operating system. After starting the process flow 128 at 132, a range of sectors to be analyzed is selected at 133. After issuing an I/O command to read the range of sectors selected, a determination is made at 134 as to whether the I/O command yielded a media error within the range of sectors being analyzed for a bad media patch or range. A negative determination at 134 causes a subsequent determination at 136 of whether the I/O completion time of the I/O command exceeded a predetermined I/O performance threshold for the range of sectors being analyzed.

The I/O performance threshold used in the determination at 136 is dependent upon the expected or optimal I/O command completion time and is based upon the typical latency to access an I/O command. This value may be an average value of the I/O command completion times for all sectors of the disk drive, which is established for the hard disk drive at the time that it is tested or burned in before initial use, or the value may be established by testing after the hard drive has been in use.

A negative determination at 136, in view of the negative determination 134, indicates the range of sectors (also known as a logical block address or LBA) encompassed by the I/O command is not impaired as indicated at 138. The next range of sectors is selected at 133 and the process flow 128 reinitiated. The process flow continues in the path through 133, 134, 136 and 138 using the next range of sectors selected at 133 until an affirmative determination occurs at 134.

An affirmative determination at 134 occurs if a media error is encountered within the range of sectors encompassed by the I/O command. An affirmative determination at 136 occurs when the I/O completion time exceeds the I/O performance threshold. After either affirmative determination at 134 or 136, the extent of the bad media patch which is causing the media error or inefficient I/O completion time is computed through further determinations which analyze the state of nearby sectors and tracks as discussed below.

A determination is made at 140 of whether other media errors have been previously reported for sector ranges adjacent to the sector range encompassed by the I/O command analyzed at 134 or 136. If other media errors have been reported for the adjacent sector ranges, the determination at 140 further determines whether the adjacent sector ranges affected are large enough to cover any of the tracks adjacent to the range of sectors of the I/O command. Different numbering techniques exist for numbering sectors within different types of disk drives, and some numbering techniques sequentially number sectors that reside on different platters within the disk drive. Thus, when determining whether the sector range is large enough to cover any of the tracks adjacent to the range of sectors of the I/O command, for some disk drives the sector range for two sectors which physically reside on adjacent tracks may encompass 20 MB or more of data to account for the platter numbering technique. The amount of data encompassed by the sector range must also account for the disk drive density or capacity, as a sector range on a higher density disk drive which covers more than one platter will necessarily encompass a larger amount of data.

In addition to different disk numbering techniques, alternate disk classification techniques may also exist, such as the one which divides each platter into zones. In any case, the identification of the adjacent sector ranges is conducted according to the specifics and in accordance with the disk classification technique.

The determination at 140 similarly determines whether large I/O completion times have been previously reported for sector ranges adjacent to the sector range encompassed by the I/O command analyzed at 134 or 136. If large I/O completion times have been previously reported for the adjacent sector ranges, the determination at 140 determines whether the adjacent sector ranges affected are large enough to cover any of the tracks adjacent to the range of sectors of the I/O command.

If other media errors or large I/O completion times for adjacent sector ranges are not extensive and they do not cover or affect tracks adjacent to the range of sectors of the I/O command, the determination at 140 is negative. Upon the negative determination at 140, a determination at 142 establishes whether or not the table 86 (FIGS. 3 and 4) includes sufficient statistics for sectors that are nearby the range of sectors of the I/O command which would allow for the computation of the extent of the bad media patch. The range of sectors involved in the determination at 142 is larger in scope than the range of sectors involved in the determination at 140, which centered upon ranges of sectors that were only adjacent to the range of sectors of the I/O command analyzed at 134 or 136.

The determination at 142 is negative when the table 86 (FIGS. 3 and 4) does not have any data or information for the nearby range of sectors of the I/O command. In this case, dummy read I/O commands are dispatched to the nearby sector ranges at 144. The RAID layer 70 dispatches the dummy read I/O commands in the same manner as is discussed below in conjunction with FIG. 9. The response to the dummy I/O commands allows further information to be obtained in the same way as information is obtained in response to a valid I/O command by which to populate the entries in the table 86 (FIGS. 3 and 4). The information from the dummy I/O commands is then available to evaluate the characteristics of the sectors in the adjacent tracks.

After the dispatch of dummy read I/O commands at 144, the amount of data available to compute the bad patch range is again determined by looping to the determinations at 140 and, if necessary upon a negative determination at 140, to the determination at 142. The looping involving the determinations at 140 and 142 and the obtaining of additional data at 144 is continued until one of the determinations 140 or 142 is affirmative. When either of the determinations at 140 or 142 is affirmative, sufficient information exists regarding the sectors and the tracks surrounding the range of sectors encompassed by the original I/O command to estimate the range of the bad or impaired patch at 146.

The estimation of the bad patch range at 146 allows the source of the media error, such as a high-fly write or particulate contaminant, to be determined based upon the outline or pattern of the bad patch range. In addition, the range of sectors which must be scrubbed is also identified at 146. To ensure accuracy in determining the range of sectors of the bad patch and the source of the media error, other adjacent sectors are identified to be scrubbed. The sectors identified for future scrubbing are added to the list of sector ranges which must be scrubbed at 148, and the state or extent of the bad patch range is also designated at 148. Determining the sectors ranges of the bad patch is an iterative process which repeats the process 128 until scrubbing the sectors does not lead to the detection of further media errors at 134 or the detection of excessive I/O completion times at 136.

Figure 7:
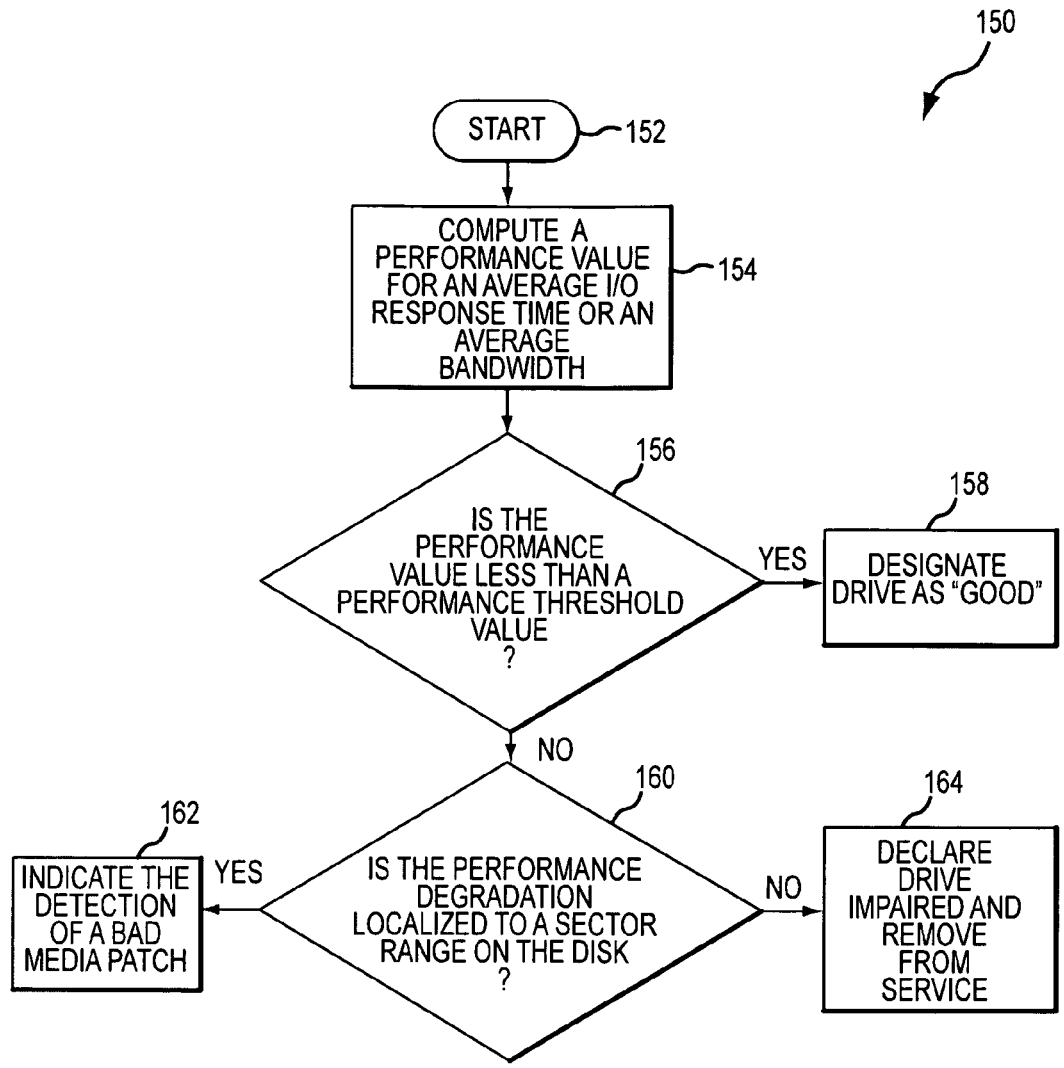
FIG. 7 is a flow diagram for evaluating the I/O efficiency of the hard disks shown in FIGS. 1 and 2.

Having explained how I/O completion times are obtained and how impaired sectors and ranges of sectors on individual and adjacent tracks are determined, and the resulting information populated into the I/O performance table 86 (FIGS. 3 and 4), the use of this information to evaluate the performance of each hard disk drive as a whole can now be explained in conjunction with a process flow 150, shown in FIG. 7. The process flow 150 is relevant for disk drives in actual use or for the quality control testing of disk drives during the manufacturing process.

The process flow 150 is initiated at 152 and is followed by the computation of a performance evaluation values at 154. These performance evaluation values characterize the performance of the hard disk drive. The performance evaluation values computed at 154 include the average I/O response completion time and the average bandwidth. The average I/O response time is the average of the I/O command completion times for a substantial number of sectors over a significant portion of the hard disk drive disk. The average bandwidth is the average data throughput or bandwidth for I/O commands executed over a sufficient number of sector ranges over a significant portion of the hard disk drive. The greater the number of sector ranges used in the calculation, the greater the accuracy of the performance values. The average I/O response time and the average bandwidth performance values are stored in the table 86 (FIGS. 3 and 4) in rows 100 and 102 (FIG. 4).

A determination at 156 assesses whether the performance evaluation value calculated at 154 and populated in the table 86 (FIGS. 3 and 4) exceeds a corresponding performance threshold. The performance threshold used in the determination at 156 depends on the type of performance evaluation value selected from the table 86 (FIGS. 3 and 4) and calculated at 154. When the performance evaluation value is the average I/O response time, the performance threshold is based upon the expected or optimal average I/O response completion time for a range of sectors of the disk drive. When the performance evaluation value is the average throughput or bandwidth, the performance threshold is based upon the expected or optimal average throughput or bandwidth for all of the sectors of the disk drive. The I/O performance threshold value used in the determination at 156 is set based on a percentage, such as 70%, of the expected or optimal I/O performance value of the hard disk drive. In other words, a value less than 100% allows less than optimal performance of the hard disk drive.

An affirmative determination at 156 occurs when the calculated performance evaluation value is equal to or greater than the performance threshold value. In this case, the performance is acceptable and the state of the hard disk drive is designated through the use of a variable as "good" at 158. If the calculated performance evaluation value is less than the performance threshold value, the determination at 156 is negative and a further determination is made at 160. The determination at 160 is whether the decreased performance is localized to a range of sectors (or LBA). The determination at 160 is made using the data contained within table 86 (FIGS. 3 and 4). If the decreased performance is characterized as being localized to a range of sectors, the determination at 160 is affirmative and the process 128 (FIG. 6) for computing the bad patch range is performed at 162.

If the determination at 160 is negative, the decreased performance of the hard disk drive is not confined to a localized range of sectors, thereby implying that the decreased performance is extensive. Under these circumstances either during the actual use of the disk drive or during the quality control testing of the disk drive during the manufacturing process, the disk drive is declared impaired and is immediately taken out of service for repair or replacement at 164. When an impaired disk drive is retired, taken out of service or offlined, it is possible to reconstruct the data contained on an impaired disk drive, provided that such an action does not lower the redundancy level of the RAID group to below 0. For example, RAID-4 or RAID-5 can reconstruct the data provided all other drives are in good condition. With RAID-DP, the data can be reconstructed even if another drive is missing or impaired. The ability to reconstruct the data contained on one disk drive in the RAID group is one of the significant redundancy benefits of a RAID configuration.

Accordingly, after the impaired disk drive is replaced by another adequately functioning disk drive, the RAID layer 70 (FIG. 3) undertakes the data reconstruction and writes that reconstructed data to the replacement disk drive. Using rapid RAID recovery can increase the efficiency of replacing the impaired disk by avoiding the time-consuming task of reconstructing the data. Rapid RAID recovery reads all of the data which can still be read from the disk drive to be retired and copies the data to the replacement disk. Rapid RAID recovery conserves the resources of the server's processor.

Figure 8:
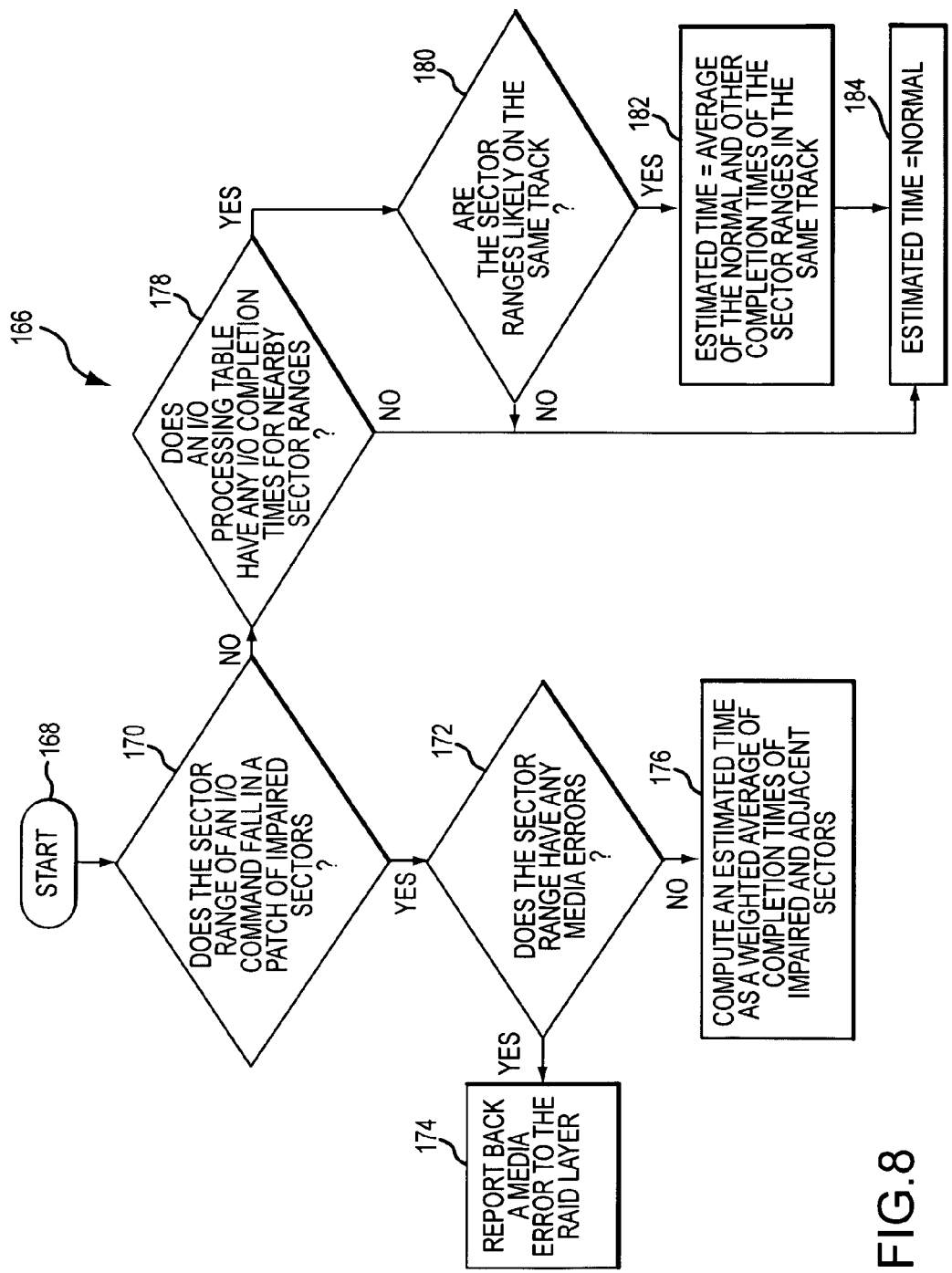
FIG. 8 is a flow diagram for estimating the completion time of an I/O command that is to be executed by the computer system shown in FIG. 1.

The use of the information in the table 86 (FIGS. 3 and 4) can also be used to estimate the I/O completion time of an I/O command, in order to avoid application timeouts and to otherwise generally maintain a high and efficient data flow through the network file storage computer system 20 (FIG. 1). A process flow 166 for estimating the I/O completion time is shown in FIG. 8.

The process flow 166 is initiated at 168 and is followed by a determination at 170 of whether the range of sectors encompassed by the I/O command falls within a bad patch. The impaired sectors typically result from media errors or from inefficient I/O completion times. When the I/O command is intended to address sectors within the bad patch, the determination at 170 is affirmative. At 172, it is next determined whether a media error exists within the range of sectors of the I/O command. If the range of sectors of the I/O command includes a media error, a media error is reported at 174. The media error reported at 174 causes the RAID layer 70 (FIG. 3) to recover the data affected by the media error by reconstructing the data using the other drives and then writing the data back to the drive.

If the determination at 172 indicates that the absence of media errors within the range of sectors of the I/O command, thereby indicating that the I/O command should execute properly, the estimated I/O completion time is computed at 176. The computation at 176 is a weighted average involving both the I/O completion times of the track or tracks which contain the patch of impaired sectors detected at the determination at 170 and the I/O completion times of the remaining sectors associated with the I/O command that reside on tracks that are adjacent to the tracks containing the impaired sectors. The computation gives greater weight to the I/O completion times of the track or tracks having the impaired sectors, while giving lesser emphasis to the sectors on the adjacent tracks. The I/O completion times for the calculation used in the weighted average computation are obtained from the table 86 (FIGS. 3 and 4). For example, the weighted average can be computed by assigning weights as 0.6 to the track or tracks with impaired sectors, 0.3 to other sectors in the adjacent track, and 0.1 to remaining sectors in the outermost track. Other values to achieve different weighted averages can be substituted for the values of 0.6, 0.3 and 0.1, if desired.

In the event the range of sectors addressed by the I/O command does not fall within a bad patch, as determined at 170, a subsequent determination is made at 178 of whether sector ranges nearby those addressed by the I/O command have previously experienced inefficient I/O completion times. These nearby sectors can adversely affect the response time of the I/O command when they reside upon the same track as the sectors associated with the I/O command. When the sectors associated with the I/O command are read, nearby sectors on the same track of the sectors associated with the I/O command are also read. If these nearby sectors have lengthy I/O completion times, then an increase in the I/O completion time of the I/O command can occur.

The determination at 178 determines whether any I/O completion times stored in the table 86 (FIGS. 3 and 4) exist for sectors nearby the sectors associated with the I/O command. When nearby sector ranges have I/O completion times which previously exceeded the I/O efficiency threshold, and hence were stored in the table 86 (FIGS. 3 and 4), the determination at 178 is affirmative which leads to another determination at 180. At 180 a determination is made of whether the nearby sector ranges reside or are likely to reside in the same track as the sector ranges addressed by the I/O command, again using the information in the table 86. An affirmative determination at 180 leads to the calculation of an estimated I/O completion time at 182. The estimated I/O completion time is an average of the normal I/O completion times and the other I/O completion times of the sector ranges within the same track.

Upon either a negative determination at 178 or 180, the estimated I/O completion time is taken as the default value or the normal amount of time to complete the I/O command, as established at 184. Such a time is typically on the order of 3 to 15 milliseconds. A negative determination at 178 occurs when the table 86 (FIGS. 3 and 4) does not have any I/O completion time data for the nearby sector ranges because none of the prior I/O completion times for these nearby sector ranges exceeded the I/O efficiency threshold. A negative determination at 180 occurs when sectors nearby the range of sectors addressed by the I/O command have I/O completion times which exceed the I/O efficiency threshold, but are not on the same tracks as the range of sectors of the I/O command.

Figure 9:
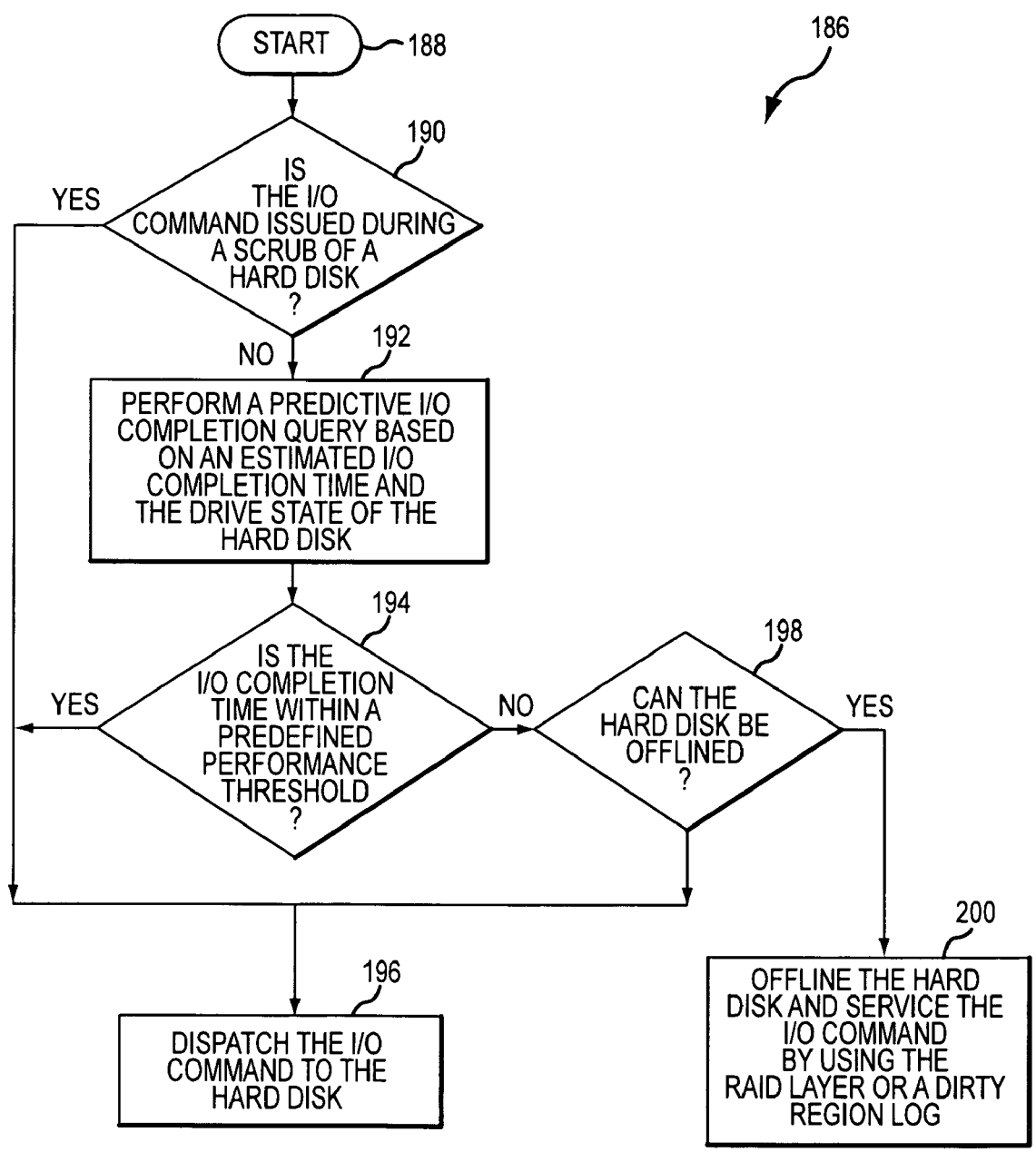
FIG. 9 is a flow diagram of using the estimated completion time derived in FIG. 8 when executing I/O commands.

The estimated time information derived at 182 and 184 is used when executing a process flow 186, shown in FIG. 9. The process flow 186 generally represents the entire functionality of the present invention when processing all I/O commands generated by the RAID layer 70 (FIG. 3).

The process flow 186 is initiated at 188 and followed by a determination at 190 of whether the I/O command is a scrub I/O command. An I/O command issued for data storage will result in a negative determination at 190. Thereafter, at 192, the amount of time required to complete the I/O command is estimated at 192. Estimating the I/O completion time at 192 is established using the process flow 166 (FIG. 8) to estimate the I/O completion time. Next at 194, a determination is made of whether the I/O completion time estimated at 192 exceeds a timeout threshold. The timeout threshold is that amount of time which the network file storage computer system 20 uses to establish a basis for determining whether a program difficulty, such as a program hang, or a hardware problem could result. The timeout threshold is therefore that maximum amount of time provided to execute an I/O command or a part of an application.

If the time estimated to complete the I/O command does not exceed the timeout threshold as determined at 194, the I/O command is dispatched to the hard disk drive at 196. Similarly, if the I/O command is a scrub command, as determined at 190, the scrub command is dispatched to the disk drive at 196. If the determination at 194 is negative, a determination is made at 198 whether it is possible to offline the disk drive through the RAID layer 70 (FIG. 3). When the determination at 198 is affirmative, the hard disk drive is offlined and the I/O command is serviced using the redundancy provided by the RAID layer 70 (FIG. 3) or by using a dirty region log at 200. By temporarily offlining the hard disk drive and servicing the I/O command through the RAID layer 70 (FIG. 3) or by using a dirty region log at 200, a time-intensive application timeout is avoided. After the completion of the I/O command serviced through the offlining of the disk drive, the disk drive can be returned online. If it is not possible to offline the disk drive, as determined at 198, the I/O command is dispatched to the disk drive at 196, because there is no other alternative if the I/O command is to be executed.

The present invention involves the collection of data which allows the I/O performance of the hard disk drive to be monitored. Through the collection of data involving the occurrence of media errors and I/O completion times, the performance of the hard disk drive is proactively managed and preventive measures taken before the failure of the hard disk drive or any other undesirable action occurs. The data collected allows the times of I/O completion commands to be estimated and potentially lengthy I/O commands to be processed by temporarily offlining the drive prior to the undesirable calling of an application timeout. The data collected also allows the I/O performance of a hard disk drive to be evaluated, either during the actual use of the disk drive or during the manufacturer's quality control testing of hard disk drive. During the actual use of a hard disk drive, a hard disk drive with dispersed areas of inefficiently operating sectors or patches is retired prior to the entire drive ultimately failing.

The significance of these and other improvements and advantages will become apparent upon gaining a full appreciation of the ramifications and improvements of the present invention. A preferred embodiment of the invention and many of its improvements have been described with a degree of particularity. The description is of a preferred example of implementing the invention, and the detailed description is not necessarily intended to limit the scope of the invention. The scope of the invention is defined by the following claims.

The invention claimed:

1. A method to evaluate input/output (I/O) performance of a hard disk drive in a mass storage computer system, and to maintain efficiency in executing I/O commands, the hard disk drive having multiple tracks and multiple sectors in each track, the method comprising:

addressing I/O commands to the sectors;

evaluating execution of the I/O commands to the sectors to obtain performance information for the sectors to which the I/O commands are addressed;

associating the performance information with the sectors to which the I/O commands are addressed;

comparing the performance information to a predetermined I/O performance criterion;

identifying any impaired sectors in which the performance information indicates less performance than the predetermined I/O performance criterion;

storing I/O completion times for the impaired sectors in a data table;

determining a range of sectors addressed by each I/O command;

accessing the data table of stored I/O completion times to obtain the I/O completion times for the range of sectors addressed by the I/O command;

predicting a completion time of the I/O command using the I/O completion times obtained from the data table;

dispatching the I/O command to the hard disk drive when the predicted completion time is less than a predetermined timeout; and servicing the I/O command by an alternate process when the predicted completion time of the I/O command is not less than the predetermined timeout.

2. A method as defined in claim 1, further comprising:
   identifying further impaired sectors adjacent to the impaired sectors to which the I/O command is addressed.

3. A method as defined in claim 2, further comprising:
   dispatching supplemental I/O commands to sectors adjacent to the impaired sectors;
   evaluating execution of the supplemental I/O commands to the adjacent sectors to obtain performance information for the adjacent sectors;
   associating the performance information with the adjacent sectors to which the supplemental I/O commands are addressed;

comparing the performance information for the adjacent sectors to the predetermined I/O performance criterion; and identifying further impaired adjacent sectors for which the performance information indicates less than the predetermined I/O performance criterion.

4. A method as defined in claim 3, further comprising:
selecting the sectors adjacent to the impaired sectors as those sectors in a predetermined range of proximity to the impaired sectors.

5. A method as defined in claim 4, further comprising:
selecting the predetermined range of proximity to the impaired sectors as a predetermined amount of sectors.

6. A method as defined in claim 3, further comprising:
selecting the sectors adjacent to the impaired sectors as sectors on the same track as the impaired sectors.

7. A method as defined in claim 3, further comprising:
selecting the sectors adjacent to the impaired sectors as sectors on tracks adjacent to the tracks containing the impaired sectors.

8. A method as defined in claim 3, further comprising:
storing addresses of the impaired sectors in a data table; and
selecting the adjacent sectors from the data table which have addresses in a predetermined range of proximity to the impaired sectors.

9. A method as defined in claim 3, further comprising:
identifying a bad patch of sectors formed by the impaired and further impaired sectors;
recognizing the bad patch of sectors as a source of degraded performance of the mass storage computer system; and
addressing I/O commands to sectors other than the bad patch of sectors.

10. A method as defined in claim 3, further comprising:
retiring the hard disk drive from further use when the impaired sectors and the further impaired sectors occupy a predetermined portion of the hard disk drive.

11. A method as defined in claim 1, wherein the servicing of the I/O command comprises one of either servicing the I/O command by reconstruction of the hard disk through a redundant array of independent disks or servicing the I/O command by a dirty region log.

12. A method as defined in claim 1, further comprising:
measuring a time required to complete each I/O command, the measured time constituting an I/O completion time; and
establishing the performance information from the I/O completion times.

13. A method as defined in claim 12, further comprising:
establishing the performance information as an average of a plurality of I/O completion times.

14. A method as defined in claim 12, further comprising:
establishing the performance information as an average bandwidth resulting from the execution of a plurality of I/O commands.

15. A method as defined in claim 12, further comprising:
using at least one scrub operation from which to measure at least one I/O completion time.

16. A method as defined in claim 1, further comprising:
avoiding addressing I/O commands to any impaired sectors.

17. A method as defined in claim 1, further comprising:
identifying a bad patch of sectors formed by the impaired sectors; and
addressing I/O commands to sectors other than the bad patch of sectors.

18. A method as defined in claim 1, further comprising:
retiring the hard disk drive when the impaired sectors are dispersed over a predetermined portion of the hard disk drive.

19. A method to enhance input/output (I/O) performance of hard disk drives in a mass storage computer system, each hard disk drive having multiple tracks and multiple sectors in each track, comprising:
addressing I/O commands to sectors of the hard disk drives;
measuring a time required to complete each I/O command, the measured time constituting an I/O completion time;
identifying any sector as an impaired sector for which the I/O completion time for the I/O commands addressed to that sector exceed a predetermined I/O completion time performance criterion;
storing I/O completion times for impaired sectors in a data table;
determining a range of sectors addressed by a current I/O command;
determining from the data table of the stored I/O completion times if the range of sectors addressed by the current I/O command includes an impaired sector;
predicting a completion time of the current I/O command using the I/O completion times obtained from the data table;
dispatching the current I/O command to the hard disk drive when the predicted completion time is not greater than a predetermined timeout which defines an acceptable time limit for completing the current I/O command; and
servicing the current I/O command by an alternate process when the predicted completion time of the current I/O command exceeds the predetermined timeout.

20. A method as defined in claim 19, wherein the servicing of the current I/O command comprises one of either servicing the I/O command by reconstruction of the hard disk through a redundant array of independent disks or servicing the command by a dirty region log.

21. A network file mass storage computer system, comprising:
a server which executes programmed instructions constituting a mass storage operating system;
a plurality of hard disks, each of the hard disks having multiple tracks and multiple sectors in each track;
a bus connecting the server to the plurality of hard disks by which to transfer information between the plurality of hard disks and the server;
a plurality of clients;
a computer network communication link connecting each of the clients to the server; and wherein:
the server executes the programmed instructions in response to I/O commands executed by the server to operatively:
address I/O commands to the sectors;
evaluate execution of the I/O commands to the addressed sectors to obtain performance information for the sectors to which the I/O commands are addressed;
associate the performance information with the sectors to which the I/O commands are addressed;
compare the performance information to a predetermined I/O performance criterion;
identify any impaired sectors in which the performance information is less than the predetermined I/O performance criterion;
measure a time required to complete each I/O command, the measured time constituting an I/O completion time;

identify any sector as an impaired sector for which the I/O completion time for the I/O commands addressed to that sector exceed a predetermined I/O completion time performance criterion;

store the I/O completion times for the impaired sectors in a data table;

determine a range of sectors addressed by each I/O command;

access the data table of the stored I/O completion times to obtain the I/O completion times for the range of sectors addressed by the I/O command;

predict a completion time of the I/O command using the I/O completion times obtained from the data table;

dispatch the I/O command to the hard disk drive when the predicted completion time does not exceed a predetermined timeout; and service the I/O command by an alternate process when the predicted completion time of the I/O command is greater than the predetermined timeout.

22. A method of enhancing the performance of a hard disk drive, comprising:

predicting an I/O completion time for an I/O command which spans a plurality of sectors by utilizing previously obtained performance information associated with the plurality of sectors;

dispatching the I/O command to the hard disk drive when the predicted I/O completion time is less than a predetermined timeout; and servicing the I/O command by an alternate process when the predicted I/O completion time exceeds the predetermined timeout.

23. A method as defined in claim 22, further comprising:

obtaining the performance information associated with the plurality of sectors from previously obtained I/O completion time measurements.

24. A computer system comprising:

a memory which stores programmed instructions;

a processing unit which executes the programmed instructions;

a hard disk drive comprising a plurality of sectors for storing data; and wherein:

the processing unit executes the programmed instructions to operatively:

predict an I/O completion time for an I/O command which spans a plurality of sectors by utilizing previously obtained performance information associated with the plurality of sectors;

dispatch the I/O command to the hard disk drive when the predicted I/O completion time is less than a predetermined timeout; and service the I/O command by an alternate process when the predicted completion time of the I/O command is greater than the predetermined timeout.

25. A computer system as defined in claim 24, wherein the performance information associated with the plurality of sectors is obtained from previously obtained I/O completion time measurements.

* * * * *